(12) United States Patent
Banvait et al.

(10) Patent No.: US 9,873,428 B2
(45) Date of Patent: Jan. 23, 2018

(54) COLLISION AVOIDANCE USING AUDITORY DATA

(71) Applicant: Ford Global Technologies, LLC, Dearborn, MI (US)

(72) Inventors: Harpreetsingh Banvait, Sunnyvale, CA (US); Kyu Jeong Han, Palo Alto, CA (US); Jinesh J Jain, San Mateo, CA (US)

(73) Assignee: Ford Global Technologies, LLC, Dearborn, MI (US)

( * ) Notice: Subject to any disclaimer, the term of this patent is extended or adjusted under 35 U.S.C. 154(b) by 156 days.

(21) Appl. No.: 14/924,187

(22) Filed: Oct. 27, 2015

(65) Prior Publication Data

US 2017/0113684 A1 Apr. 27, 2017

(51) Int. Cl.
*B60W 30/09* (2012.01)
*H04L 29/08* (2006.01)
*B60W 30/095* (2012.01)

(52) U.S. Cl.
CPC ............. *B60W 30/09* (2013.01); *H04L 67/12* (2013.01); *B60W 30/0956* (2013.01); *B60W 2420/42* (2013.01); *B60W 2420/54* (2013.01); *B60W 2550/10* (2013.01)

(58) Field of Classification Search
CPC .... B60W 30/08; B60W 30/09; B60W 30/095; B60W 30/096; B60W 2550/10; B62D 15/025; B62D 15/0265; G05D 1/0238; G05D 1/0246; G05D 1/0289
See application file for complete search history.

(56) References Cited

U.S. PATENT DOCUMENTS

| 6,057,754 | A | * | 5/2000 | Kinoshita | ................ B62D 1/28 340/435 |
| 6,151,539 | A | | 11/2000 | Bergholz | |
| 8,605,948 | B2 | | 12/2013 | Mathony | |

(Continued)

FOREIGN PATENT DOCUMENTS

DE 102012009555 A1 11/2012
JP H0592767 U 12/1993

(Continued)

OTHER PUBLICATIONS

China: 6th Intelligent Vehicle Future Challenge (IVFC'2014) in Changshu, Published: Nov. 17, 2014 | Changshu, China.

*Primary Examiner* — Thomas G Black
*Assistant Examiner* — Sara J Lewandroski
(74) *Attorney, Agent, or Firm* — David R. Stevens; Stevens Law Group

(57) ABSTRACT

A controller for an autonomous vehicle receives audio signals from one or more microphones. The outputs of the microphones are pre-processed to enhance audio features that originated from vehicles. The outputs may also be processed to remove noise. The audio features are input to a machine learning model that classifies the source of the audio features. For example, features may be classified as originating from a vehicle. A direction to a source of the audio features is determined based on relative delays of the audio features in signals from multiple microphones. Where audio features are classified with an above-threshold confidence as originating from a vehicle, collision avoidance is performed with respect to the direction to the source of the audio features.

16 Claims, 5 Drawing Sheets

(56) References Cited

U.S. PATENT DOCUMENTS

| | | | |
|---|---|---|---|
| 8,676,427 B1 | 3/2014 | Ferguson | |
| 8,694,192 B2 | 4/2014 | Cullinane | |
| 8,781,669 B1 | 7/2014 | Teller | |
| 8,849,557 B1 | 9/2014 | Levandowski | |
| 2006/0016262 A1* | 1/2006 | Sato | G01S 7/52004 73/579 |
| 2011/0175755 A1* | 7/2011 | Yoshioka | G01S 3/8083 340/995.1 |
| 2012/0253582 A1* | 10/2012 | Chrysanthakopoulos | G05D 1/024 701/26 |
| 2012/0296523 A1* | 11/2012 | Ikeda | B60R 1/00 701/41 |
| 2013/0222127 A1* | 8/2013 | Ray Avalani | B60Q 9/008 340/436 |
| 2015/0051753 A1* | 2/2015 | Kawamata | G01S 7/54 701/1 |
| 2015/0158482 A1* | 6/2015 | Kaminade | G01S 3/86 701/1 |
| 2016/0003943 A1* | 1/2016 | Nakano | G08G 1/166 701/301 |
| 2016/0016560 A1* | 1/2016 | Parker | B60W 30/09 701/70 |
| 2016/0057726 A1* | 2/2016 | Bai | H04W 64/00 340/686.6 |
| 2016/0217689 A1* | 7/2016 | Young | G08G 1/0965 |
| 2016/0232915 A1* | 8/2016 | Lepauloux | G10L 21/0208 |
| 2017/0024877 A1* | 1/2017 | Versace | G06K 9/00664 |
| 2017/0120814 A1* | 5/2017 | Kentley | B60Q 9/008 |

FOREIGN PATENT DOCUMENTS

| | | | |
|---|---|---|---|
| JP | 2011232292 A | 11/2011 | |
| JP | 4967927 B2 | 7/2012 | |
| JP | 5303998 B2 | 10/2013 | |

* cited by examiner

COLLISION AVOIDANCE USING AUDITORY DATA

BACKGROUND

Field of the Invention

This invention relates to performing obstacle avoidance in autonomous vehicles.

Background of the Invention

Autonomous vehicles are equipped with sensors that detect their environment. An algorithm evaluates the output of the sensors and identifies obstacles. A navigation system may then steer the vehicle, brake, and/or accelerate to both avoid the identified obstacles and reach a desired destination. Sensors may include both imaging system, e.g. video cameras, as well as RADAR or LIDAR sensors.

The systems and methods disclosed herein provide an improved approach for detecting obstacles.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which.

DETAILED DESCRIPTION

Figure 1:
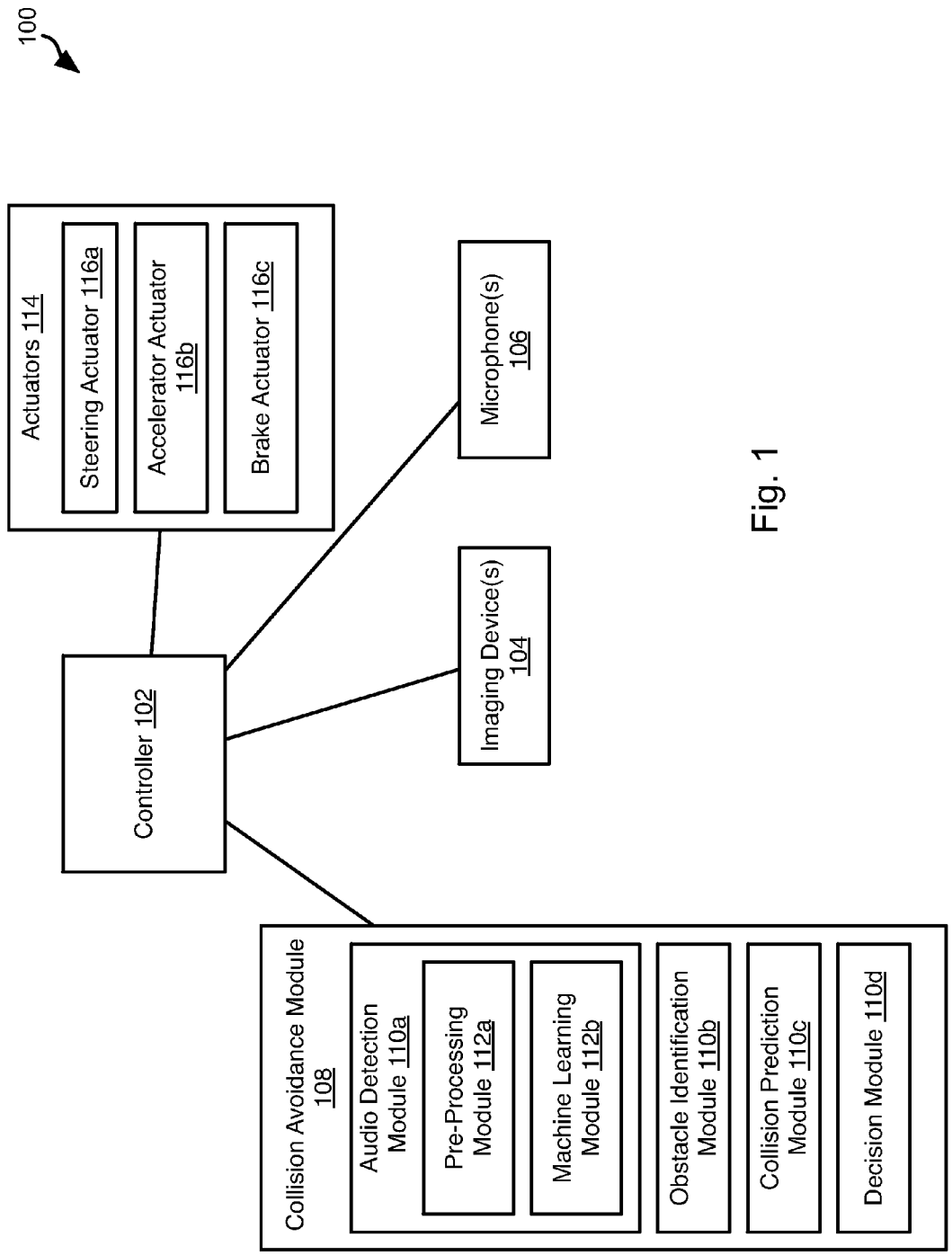
FIG. 1 is a schematic block diagram of a system for implementing embodiments of the invention.

It will be readily understood that the components of the present invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout.

Embodiments in accordance with the present invention may be embodied as an apparatus, method, or computer program product. Accordingly, the present invention may take the form of an entirely hardware embodiment, an entirely software embodiment (including firmware, resident software, micro-code, etc.), or an embodiment combining software and hardware aspects that may all generally be referred to herein as a "module" or "system." Furthermore, the present invention may take the form of a computer program product embodied in any tangible medium of expression having computer-usable program code embodied in the medium.

Any combination of one or more computer-usable or computer-readable media may be utilized. For example, a computer-readable medium may include one or more of a portable computer diskette, a hard disk, a random access memory (RAM) device, a read-only memory (ROM) device, an erasable programmable read-only memory (EPROM or Flash memory) device, a portable compact disc read-only memory (CDROM), an optical storage device, and a magnetic storage device. In selected embodiments, a computer-readable medium may comprise any non-transitory medium that can contain, store, communicate, propagate, or transport the program for use by or in connection with the instruction execution system, apparatus, or device.

Computer program code for carrying out operations of the present invention may be written in any combination of one or more programming languages, including an object-oriented programming language such as Java, Smalltalk, C++, or the like and conventional procedural programming languages, such as the "C" programming language or similar programming languages. The program code may execute entirely on a computer system as a stand-alone software package, on a stand-alone hardware unit, partly on a remote computer spaced some distance from the computer, or entirely on a remote computer or server. In the latter scenario, the remote computer may be connected to the computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions or code. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a non-transitory computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Referring to FIG. 1, a controller 102 may be housed within a vehicle. The vehicle may include any vehicle known in the art. The vehicle may have all of the structures and features of any vehicle known in the art including, wheels, a drive train coupled to the wheels, an engine coupled to the drive train, a steering system, a braking system, and other systems known in the art to be included in a vehicle.

As discussed in greater detail herein, the controller 102 may perform autonomous navigation and collision avoidance. In particular, image data and audio data may be analyzed to identify obstacles. In particular, audio data may be used to identify vehicles that are not in the field of view of one or more cameras or other imaging sensors, as described in detail below with respect to FIGS. 3 and 4.

The controller 102 may receive one or more image streams from one or more imaging devices 104. For example, one or more cameras may be mounted to the vehicle and output image streams received by the controller 102. The controller 102 may receive one or more audio streams from one or more microphones 106. For example, one or more microphones or microphone arrays may be mounted to the vehicle and output audio streams received by the controller 102. The microphones 106 may include directional microphones having a sensitivity that varies with angle.

The controller 102 may execute a collision avoidance module 108 that receives the image streams and audio streams and identifies possible obstacles and takes measures to avoid them. In the embodiments disclosed herein, only image and audio data is used to perform collision avoidance. However, other sensors to detect obstacles may also be used such as RADAR, LIDAR, SONAR, and the like. Accordingly, the "image streams" received by the controller 102 may include one or both of optical images detected by a camera and objects and topology sensed using one or more other sensing devices. The controller 102 may then analyze both images and sensed objects and topology in order to identify potential obstacles The collision avoidance module 108 may include an audio detection module 110a. The audio detection module 110a may include an audio pre-processing module 112a that is programmed to process the one or more audio streams in order to identify features that could correspond to a vehicle. The audio detection module 110a may further include a machine learning module 112b that implements a model that evaluates features in processed audio streams from the pre-processing module 112a and attempts to classify the audio features. The function of the modules 112a, 112b of the audio detection module 110a is described in greater detail below with respect to the method 500 of FIG. 5.

The collision avoidance module 108 may further include an obstacle identification module 110b, a collision prediction module 110c, and a decision module 110d. The obstacle identification module 110b analyzes the one or more image streams and identifies potential obstacles, including people, animals, vehicles, buildings, curbs, and other objects and structures. In particular, the obstacle identification module 110b may identify vehicle images in the image stream.

The collision prediction module 110c predicts which obstacle images are likely to collide with the vehicle based on its current trajectory or current intended path. The collision prediction module 110c may evaluate the likelihood of collision with objects identified by the obstacle identification module 110b as well as obstacles detected using the audio detection module 110a. The decision module 110d may make a decision to stop, accelerate, turn, etc. in order to avoid obstacles. The manner in which the collision prediction module 110c predicts potential collisions and the manner in which the decision module 110d takes action to avoid potential collisions may be according to any method or system known in the art of autonomous vehicles.

The decision module 110d may control the trajectory of the vehicle by actuating one or more actuators 114 controlling the direction and speed of the vehicle. For example, the actuators 114 may include a steering actuator 116a, an accelerator actuator 116b, and a brake actuator 116c. The configuration of the actuators 116a-116c may be according to any implementation of such actuators known in the art of autonomous vehicles.

Figure 2:
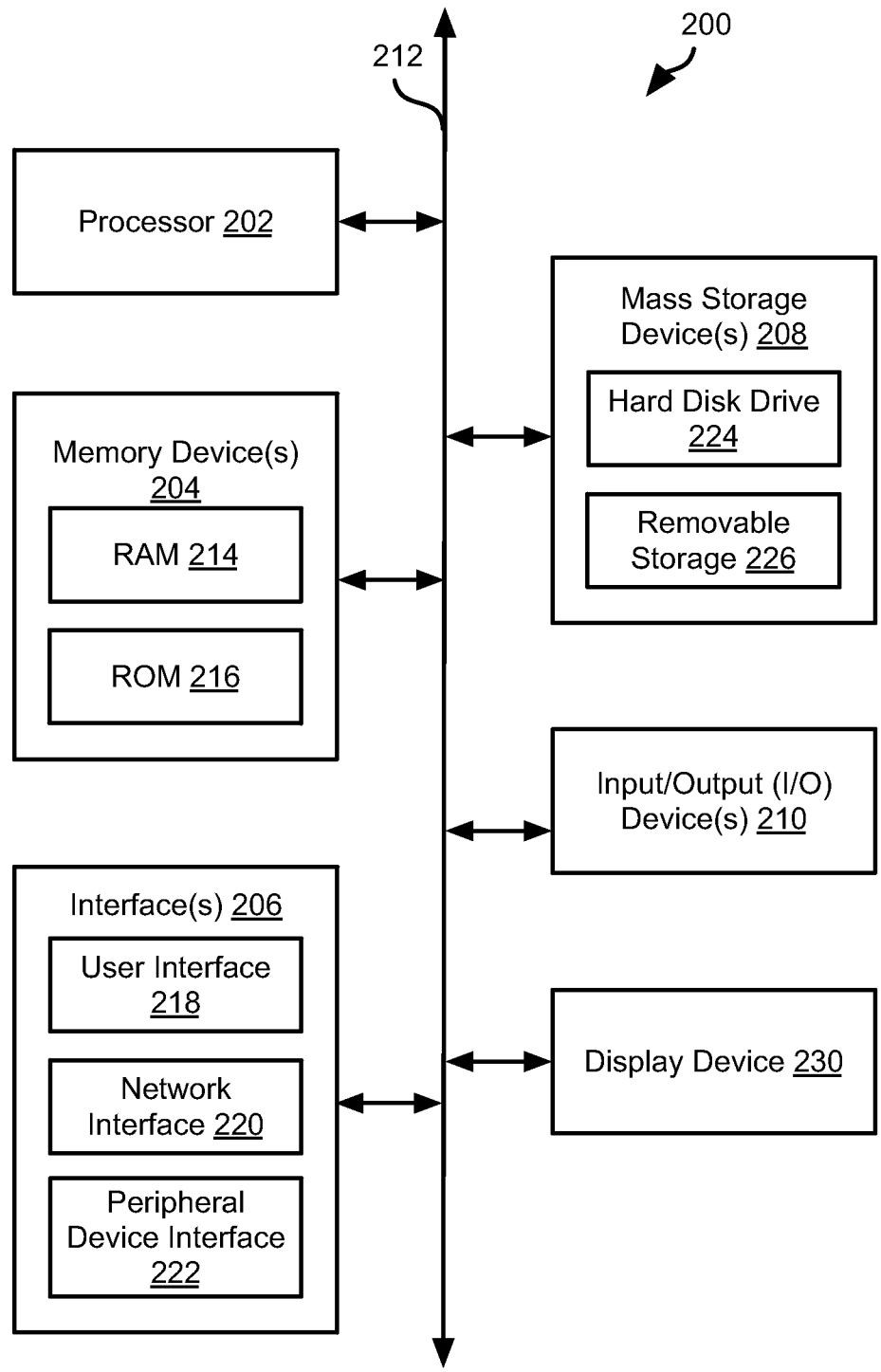
FIG. 2 is a schematic block diagram of an example computing device suitable for implementing methods in accordance with embodiments of the invention.

FIG. 2 is a block diagram illustrating an example computing device 200. Computing device 200 may be used to perform various procedures, such as those discussed herein. The controller 102 may have some or all of the attributes of the computing device 200.

Computing device 200 includes one or more processor(s) 202, one or more memory device(s) 204, one or more interface(s) 206, one or more mass storage device(s) 208, one or more Input/Output (I/O) device(s) 210, and a display device 230 all of which are coupled to a bus 212. Processor(s) 202 include one or more processors or controllers that execute instructions stored in memory device(s) 204 and/or mass storage device(s) 208. Processor(s) 202 may also include various types of computer-readable media, such as cache memory.

Memory device(s) 204 include various computer-readable media, such as volatile memory (e.g., random access memory (RAM) 214) and/or nonvolatile memory (e.g., read-only memory (ROM) 216). Memory device(s) 204 may also include rewritable ROM, such as Flash memory.

Mass storage device(s) 208 include various computer readable media, such as magnetic tapes, magnetic disks, optical disks, solid-state memory (e.g., Flash memory), and so forth. As shown in FIG. 2, a particular mass storage device is a hard disk drive 224. Various drives may also be included in mass storage device(s) 208 to enable reading from and/or writing to the various computer readable media. Mass storage device(s) 208 include removable media 226 and/or non-removable media.

I/O device(s) 210 include various devices that allow data and/or other information to be input to or retrieved from computing device 200. Example I/O device(s) 210 include cursor control devices, keyboards, keypads, microphones, monitors or other display devices, speakers, printers, network interface cards, modems, lenses, CCDs or other image capture devices, and the like.

Display device 230 includes any type of device capable of displaying information to one or more users of computing device 200. Examples of display device 230 include a monitor, display terminal, video projection device, and the like.

Interface(s) 206 include various interfaces that allow computing device 200 to interact with other systems, devices, or computing environments. Example interface(s) 206 include any number of different network interfaces 220, such as interfaces to local area networks (LANs), wide area networks (WANs), wireless networks, and the Internet. Other interface(s) include user interface 218 and peripheral device interface 222. The interface(s) 206 may also include one or more peripheral interfaces such as interfaces for printers, pointing devices (mice, track pad, etc.), keyboards, and the like.

Bus 212 allows processor(s) 202, memory device(s) 204, interface(s) 206, mass storage device(s) 208, I/O device(s)

210, and display device 230 to communicate with one another, as well as other devices or components coupled to bus 212. Bus 212 represents one or more of several types of bus structures, such as a system bus, PCI bus, IEEE 1394 bus, USB bus, and so forth.

For purposes of illustration, programs and other executable program components are shown herein as discrete blocks, although it is understood that such programs and components may reside at various times in different storage components of computing device 200, and are executed by processor(s) 202. Alternatively, the systems and procedures described herein can be implemented in hardware, or a combination of hardware, software, and/or firmware. For example, one or more application specific integrated circuits (ASICs) can be programmed to carry out one or more of the systems and procedures described herein.

Figure 3:
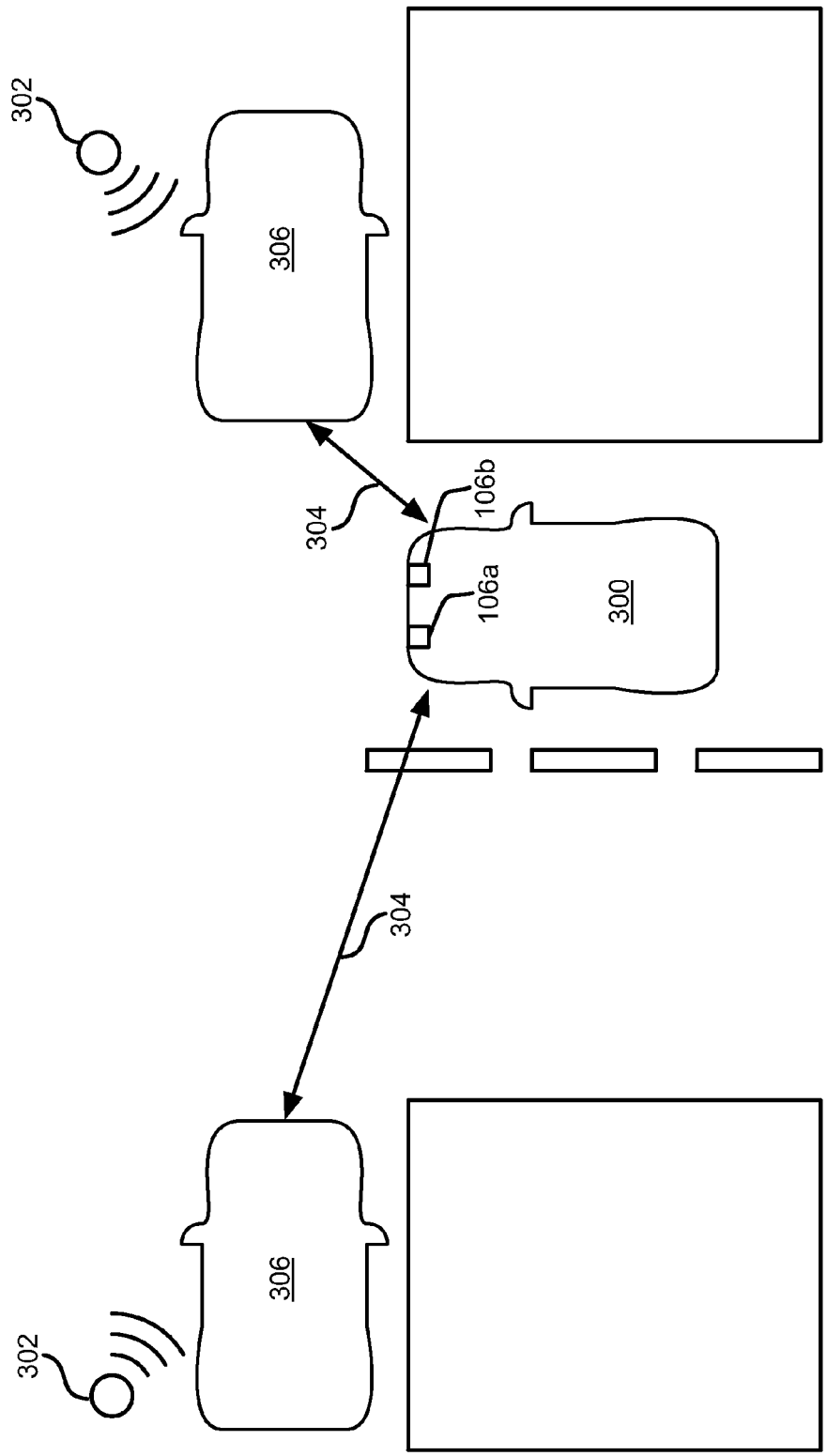
FIG. 3 is a diagram illustrating obstacle detection using auditory data.

Turning now to FIG. 3, in many instances a vehicle housing the controller 102 (hereinafter the vehicle 300) may be prevented from visually detecting a potential obstacle 302, such as another vehicle, cyclist, pedestrian, or the like. For example, the obstacle 302 may be obscured from a line of sight 304 of a driver or image sensor 104 by an occluding object 306 such as parked vehicle, building, tree, sign, etc. Accordingly, imaging devices 104 may not be effective at detecting such obstacles. However, the vehicle 300 may be close enough to detect sound generated by the occluded obstacle 302 using microphones 106, particularly where the occluded obstacle 302 is a vehicle. Although the methods disclosed herein are particularly useful where there is an occluding object 306, the identification of obstacles as described herein may be performed where image data is available and may, for example, confirm the location of an obstacle that is also visible to imaging devices 104.

Figure 4:
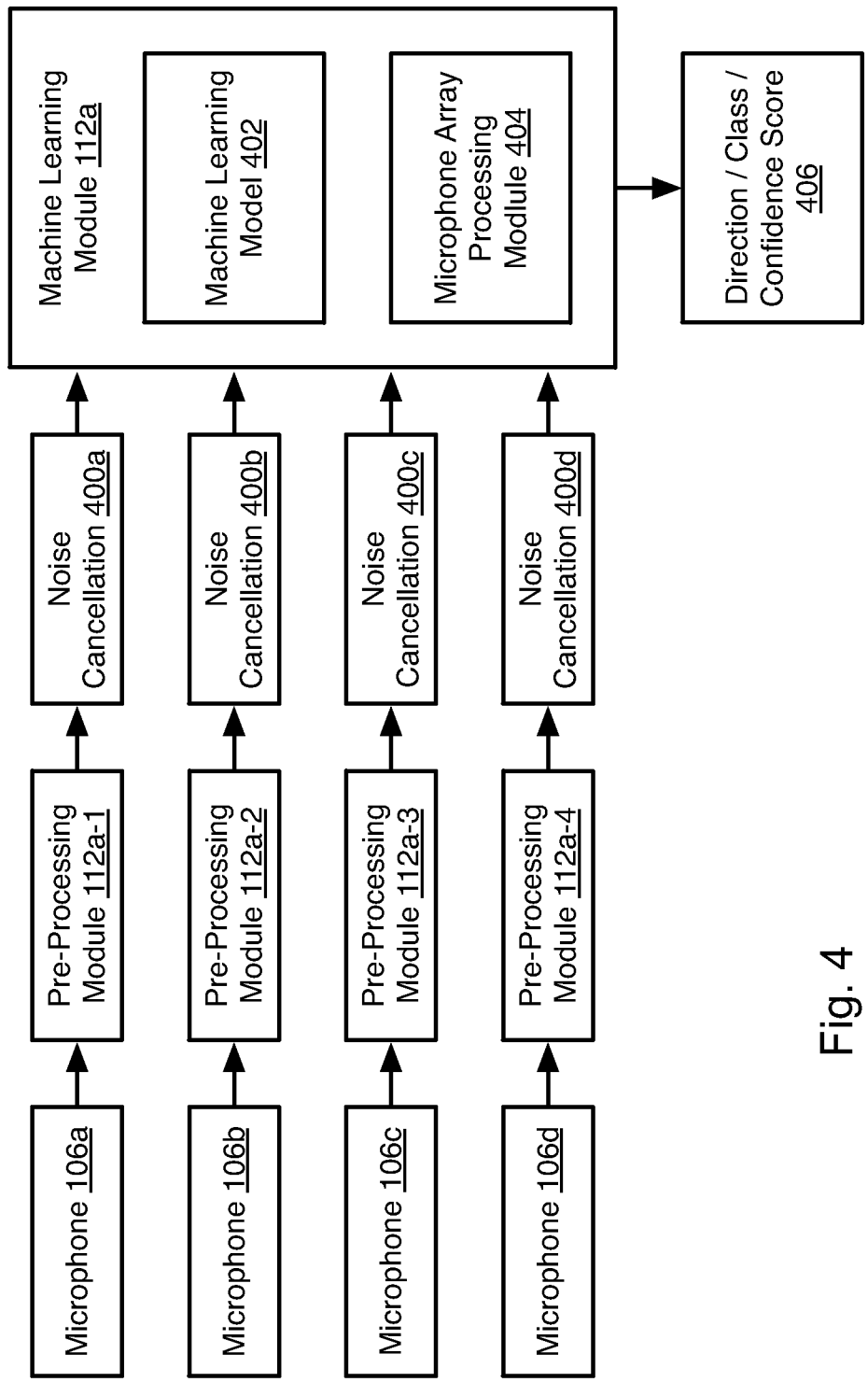
FIG. 4 is a schematic block diagram of components for performing obstacle detection using auditory data.

Referring to FIG. 4, the microphone 106 may include a plurality of microphones 106a-106d. The output signal of each microphone 106a-106d may be input to a corresponding pre-processing module 112a-1-112a-4. The output of each pre-processing module 112a-1-112a-4 may be further processed by a noise cancellation filter 400a-400d. The output of the noise cancelation modules 400a-400d may then be input to the machine learning module 112b. In particular, the outputs of the noise cancelation modules 400a-400d may be input to a machine learning model 402 that classifies features in the outputs as corresponding to a particular vehicle. The machine learning model 112b may further output a confidence in the classification.

The pre-processing modules 112a-1-112a-4 may process the raw outputs from the microphones 106a-106d and produce processed outputs that are input to the noise cancelation modules 400a-400d or directly to the machine learning module 112a. The processed outputs may be a filtered version of the raw outputs, the processed outputs having enhanced audio features relative to the raw outputs. The enhanced audio features may be segments, frequency bands, or other components of the raw outputs that are likely to correspond to a vehicle. Accordingly, the pre-processing module 112a-1-112a-4 may include a bandpass filter that passes through a portion of the raw outputs in a frequency band corresponding to sounds generated by vehicles and vehicle engines while blocking portions of the raw outputs outside of that frequency band. The pre-processing modules 112a-1-112a-4 may be digital filters having coefficients chosen to pass signals having spectral content and/or a temporal profile corresponding to a vehicle engine or other vehicle noise, such as an adaptive filter with experimentally selected coefficients that will pass through vehicle-generated sounds while attenuating other sounds. The output of the pre-processing modules 112a-1-112a-4 may be a time domain signal or a frequency domain signal, or both. The output of the pre-processing modules 112a-1-112a-4 may include multiple signals, including signals in one or both of the time domain and frequency domain. For example, signals that are the result of filtering using different pass-band filters may be output either in the frequency or time domain.

The noise cancellation modules 400a-400d may include any noise cancellation filter known in the art or implement any noise cancellation approach known in the art. In particular, the noise cancellation modules 400a-400d may further take as inputs the speed of the vehicle 300, a rotational speed of an engine of the vehicle 300 or other information describing a status of the engine, a speed of a ventilation fan of the vehicle 300, or other information. This information may be used by the noise cancellation modules 400a-400d to remove noise caused by the engine and fan and vehicle wind noise.

The machine learning model 402 may be a deep neural network, however other types of machine learning models may be used, such as a decision tree, clustering, Bayesian network, genetic, or other type of machine learning model. The machine learning model 402 may be trained with various types of noises in various types of situations. In particular, sounds recorded using the array of microphones 106a-106d (or an array with similar specifications) may be recorded from a known source at various relative locations, relative speeds, and with and without background noise.

The model 402 may then be trained to recognize the sounds from the known source. For example, the model may be trained using <audio input, class of sound source> entries that each pair audio recordings using the microphones 106a-106d under the various situations noted above and the class of the sound source. The machine learning algorithm may then use these entries to train a model 402 to output the class of a sound source for a given audio input. The machine learning algorithm may train the model 402 for various classes of sound source. Accordingly, a set of training entries may be generated for each class of sound source and the model trained therewith, or separate models trained for each class of sound source. The machine learning model 402 may output both a decision and a confidence score for that decision. Accordingly, the machine learning model 402 may product an output indicating whether input signals correspond to a particular class or not, and a confidence score that this output is correct.

The machine learning module 112b may further include a microphone array processing module 404. The microphone array processing module 404 may evaluate the timing of arrival of an audio feature from various microphones 106a-106d in order to estimate a direction to a source of the audio feature. For example, an audio feature may be the sound of a vehicle that commences at time T1, T2, T3, and T4 in the outputs of the noise cancellation modules 400a-400d. Accordingly, knowing the relative positions of the microphones 106a-106d and the speed of sound S, the difference in distance to the source from the microphones 106a-106d may be determined, e.g. $D2=S/(T2-T1)$, $D3=S/(T3-T1)$, $D4=S/(T4-T1)$, where D2, D3, D4 are the estimated difference in distance traveled by the audio feature relative to a reference microphone, which is microphone 106a in this example.

For example, the angle A to the source of a sound may be calculated as an average of $A\sin(D2/R2)$, $A\sin(D3/R3)$, and $A\sin(D4/R4)$, where R2 is the separation between the microphone 106a and microphone 106b, R3 is the separation between microphone 106c and microphone 106a, and R4 is the separation between microphone 106d and microphone 106a. This approach assumes that the source of the sound is at a large distance from the microphones 106a-106d such that the incident sound wave may be approximated as a plane wave. Other approaches for identifying the direction to a sound based on different times of arrival as known in the art may also be used. Likewise, rather than simply determining a direction, a sector or range of angles may be estimated, i.e. a range of uncertainty about any estimated direction, where the range of uncertainty a limitation on the accuracy of the direction estimation technique used.

The direction as estimated by the microphone array processing module 404 and the classification and confidence score as generated by the machine learning model 402 may then be provided as an output 406 from the machine learning module 112b. For example, the obstacle identification module 110b may add a vehicle having the identified class located at the estimated direction to a set of potential obstacles, the set of potential obstacles including any obstacles identified by other means, such as using the imaging devices 104. The collision prediction module 110c may then perform identify potential collisions with the set of potential obstacles and the decision module 110d may then determine actions to be performed to avoid the potential collisions such as turning the vehicle, applying brakes, accelerating, or the like.

Figure 5:
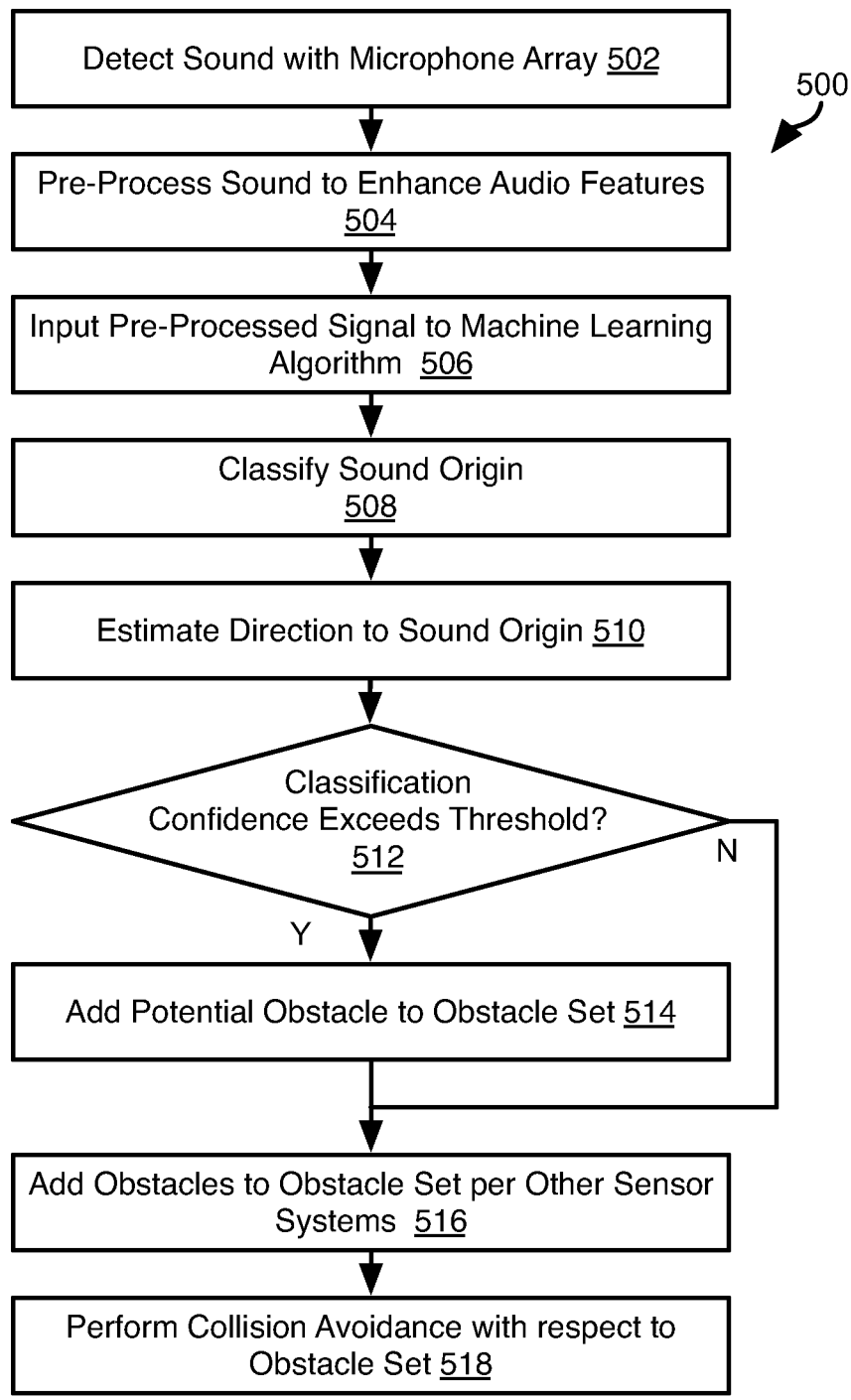
FIG. 5 is a process flow diagram of a method for performing collision avoidance based on both auditory data in accordance with an embodiment of the present invention.

FIG. 5 illustrates a method 500 that may be executed by the controller 102 by processing audio signals from the microphones 106a-106d. The method 500 may include generating 502 audio signals representing detected sounds using the microphones 106a-106d and pre-processing 504 the audio signals to enhance audio features. This may include performing any of the filtering functions described above with respect to the pre-processing modules 112a-1-112a-4. In particular, pre-processing 504 may include generating one or more pre-processed signals in the time domain or frequency domain, each output may be a bandpass filtered version of an audio signal from one of the microphones 106a-106d or may be filtered or otherwise processed using other techniques, such as using an adaptive filter or other audio processing technique. Pre-processing 504 may further include performing noise cancellation on either the input or output of the pre-processing modules 112a-1-112a-4 as described above with respect to the noise cancellation modules 400a-400d.

The method 500 may further include inputting 506 the pre-processed signals into the machine learning model 402. The machine learning model 402 will then classify 508 the origin of the sound, i.e. the attributes of the audio features in the pre-processed signals will be processed according to the machine learning model 402, which will then output one or more classifications and confidence scores for the one or more classifications.

The method 500 may further include estimating 510 a direction to the origin of the sound. As described above, this may include invoking the functionality of the microphone array processing module 404 to evaluate differences in the time of arrival of audio features in the pre-processed outputs to determine a direction to the originator of the audio features or a range of possible angles to the originator of the audio features.

The method 500 may include evaluating 512 whether the confidence score of the classification at step 508 exceeds a threshold. For example, where no classifications at step 508 have a confidence score above a threshold, the method 500 may include determining that the audio features that were the basis of the classification likely do not correspond to a vehicle. Otherwise, if the confidence score does exceed a threshold, then the method 500 may include adding 514 a potential obstacle to a set of obstacles identified by other means, such as using imaging devices 104. The potential obstacle may be defined as a potential obstacle located in the direction or range of angles determined at step 510.

In either outcome of step 512, obstacles are detected using other sensing systems, such as the imaging devices 104, and obstacles detected using these sensing systems are added 516 to the obstacle set. Collision avoidance is performed 518 with respect to the obstacle set. As noted above, this may include detecting potential collisions and activating one or more of a steering actuator 116a, accelerator actuator 116b, and brake actuator 116c in order to avoid the obstacles of the obstacle set as well as guiding the vehicle to an intended destination.

The present invention may be embodied in other specific forms without departing from its spirit or essential characteristics. The described embodiments are to be considered in all respects only as illustrative, and not restrictive. The scope of the invention is, therefore, indicated by the appended claims, rather than by the foregoing description. All changes which come within the meaning and range of equivalency of the claims are to be embraced within their scope.

What is claimed is:

1. A system for an autonomous vehicle comprising:
two or more microphones mounted to the autonomous vehicle;
a controller executing
a pre-processor programmed to detect audio features in two or more audio streams from the two or more microphones;
a collision avoidance module programmed to classify the audio features and a direction to a source thereof, and, if the class for the sound source is a vehicle, invoke obstacle avoidance with respect to the direction;
wherein the collision avoidance module is further programmed to:
classify the audio features by inputting the audio features into a machine learning model; and
wherein the machine-learning model outputs a confidence value indicating a probability that the audio features correspond to a vehicle.

2. The system of claim 1, wherein the collision avoidance module is further programmed to invoke obstacle avoidance with respect to the direction to the source of the audio features by actuating at least one of a steering actuator, accelerator actuator, and brake actuator of the autonomous vehicle effective to avoid collision with the source of the audio features.

3. The system of claim 1, wherein the collision avoidance module is further programmed to:
receive two or more image streams from two or more cameras mounted to the autonomous vehicle;
identify a set of potential obstacles among the plurality of vehicle images;
evaluate possible collisions between the autonomous vehicle and the set of potential obstacles and the source of the audio features; and
activate at least one of a steering actuator, accelerator actuator, and brake actuator of the autonomous vehicle effective to avoid collisions with the set of potential obstacles.

4. The system of claim 3, wherein the two or more microphones are configured to detect sounds from the source of the audio features when the source of the audio features is not in a field of view of any of the two or more cameras.

5. The system of claim 1, wherein the collision avoidance module is further programmed to identify the audio features by filtering the two or more audio streams to obtain two or more filtered signals each including one or more of the audible features.

6. The system of claim 5, wherein the collision avoidance module is further programmed to filter the two or more audio streams by removing ambient noise from the two or more audio streams.

7. The system of claim 1, wherein the machine learning model is a deep neural network.

8. The system of claim 1, wherein the collision avoidance module is further programmed to detect the direction to the source of the audio features by evaluating a time difference between the audio features.

9. A method for obstacle detection in an autonomous vehicle, the method comprising:
   receiving, by a controller including one or more processing devices, two or more audio streams from two or more microphones mounted to the autonomous vehicle;
   detecting, by the controller, audio features in the two or more audio streams;
   detecting, by the controller, a direction to a sound source according to the audio features;
   identifying, by the controller, a class for the sound source according to the audio features; and
   determining, by the controller, that the class for the sound source is a vehicle,
   in response to determining that the class for the sound source is a vehicle, invoking obstacle avoidance with respect to the direction to the sound source;
   wherein identifying the class for the sound source according to the audio features comprises inputting, by the controller, the audio features into a machine learning model; and
   wherein the method further comprises outputting, by the machine-learning model, a confidence value indicating a probability that the audio features correspond to a vehicle.

10. The method of claim 9, wherein the machine learning model is a deep neural network.

11. The method of claim 9, wherein detecting the direction to the sound source according to the audio features comprises evaluating, by the controller, a time difference between the audio features.

12. The method of claim 9, further comprising invoking obstacle avoidance with respect to the direction to the sound source by actuating at least one of a steering actuator, accelerator actuator, and brake actuator of the autonomous vehicle effective to avoid collision with the sound source.

13. The method of claim 9, further comprising:
   receiving, by the controller, two or more image streams from two or more cameras mounted to the autonomous vehicle;
   identifying, by the controller, a set of potential obstacles among the plurality of vehicle images;
   evaluating, by the controller, possible collisions between the autonomous vehicle and the set of potential obstacles and the sound source; and
   activating, by the controller, at least one of a steering actuator, an accelerator actuator, and a brake actuator of the autonomous vehicle effective to avoid collisions with the set of potential obstacles.

14. The method of claim 13, wherein the sound source is not in a field of view of any of the two or more cameras.

15. The method of claim 9, wherein identifying the audible features comprises filtering, by the controller, the two or more audio streams to obtain two or more filtered signals each including one or more of the audible features.

16. The method of claim 15, wherein filtering the two or more audio streams further comprises removing ambient noise from the two or more audio streams.

* * * * *